(12) United States Patent
Shimada et al.

(10) Patent No.: US 8,225,690 B2
(45) Date of Patent: Jul. 24, 2012

(54) POWER TRANSMISSION DEVICE

(75) Inventors: Yuji Shimada, Nissin (JP); Katsuya Kobayashi, Okazaki (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1161 days.

(21) Appl. No.: 12/033,151

(22) Filed: Feb. 19, 2008

(65) Prior Publication Data
US 2008/0196530 A1 Aug. 21, 2008

(30) Foreign Application Priority Data

Feb. 19, 2007 (JP) .................................. 2007-038123

(51) Int. Cl.
*F16H 55/14* (2006.01)
*F16H 55/00* (2006.01)
(52) U.S. Cl. .......................................... 74/443; 74/462
(58) Field of Classification Search .................. 74/460, 74/462, 434, 443, 457
See application file for complete search history.

(56) References Cited

U.S. PATENT DOCUMENTS

| | | | | |
|---|---|---|---|---|
| 1,803,294 A | * | 4/1931 | Bethune | 74/443 |
| 2,761,327 A | * | 9/1956 | Sawyer et al. | 74/443 |
| 3,241,392 A | * | 3/1966 | Hardy | 74/462 |
| 3,401,580 A | * | 9/1968 | Sigg | 475/344 |
| 4,474,074 A | * | 10/1984 | Nakao et al. | 74/462 |
| 4,519,264 A | * | 5/1985 | Inui | 74/409 |
| 2007/0137355 A1 | * | 6/2007 | Ohmi et al. | 74/462 |

FOREIGN PATENT DOCUMENTS

| | | |
|---|---|---|
| DE | 103 31 559 A1 | 2/2004 |
| JP | 02-008537 A | 1/1990 |
| JP | 6-25652 A | 4/1994 |
| JP | 6-25652 U | 4/1994 |
| JP | 2000-097294 A | 4/2000 |
| JP | 2000-220726 A | 8/2000 |
| JP | 2001-263453 A | 9/2001 |
| JP | 2002-235836 A | 8/2002 |
| JP | 2002-235837 A | 8/2002 |
| JP | 2003-240065 A | 8/2003 |
| JP | 2003-322225 A | 11/2003 |
| JP | 2004-125054 A | 4/2004 |
| JP | 2005-61487 A | 3/2005 |
| JP | 2006-144995 A | 6/2006 |
| JP | 2006-187177 A | 7/2006 |

* cited by examiner

*Primary Examiner* — Thomas B Will
*Assistant Examiner* — Abigail A Risic
(74) *Attorney, Agent, or Firm* — Sughrue Mion, PLLC

(57) ABSTRACT

A power transmission device is provided with: a first gear having a plurality of teeth that share an identical tooth profile; an intermediate gear that is engaged with the first gear; and a second gear that is engaged with the intermediate gear, and has a plurality of teeth that share an identical tooth profile, wherein the first gear and the second gear have an identical number of teeth, an identical reference diameter, and an identical reference pitch; and the tooth profile of the first gear is different from that of the second gear.

6 Claims, 10 Drawing Sheets

POWER TRANSMISSION DEVICE

INCORPORATION BY REFERENCE

The disclosure of Japanese Patent Application No. 2007-038123 filed on Feb. 19, 2007 including the specification, drawings and abstract is incorporated herein by reference in its entirety.

BACKGROUND OF THE INVENTION

1. Field of the Invention

The invention relates to a power transmission device.

2. Description of the Related Art

A power transmission device transmits power from one device to another. Some power transmission devices include a plurality of gears engaged with each other. Four-wheel drive vehicles and large six-wheel drive vehicles, for example, have a power transmission device that distributes driving force between the front wheels and rear wheels.

The power transmission device includes three gears: a drive gear to which power from an engine is input, an idler gear for that engages the drive gear, and a driven gear that engages the idler gear.

Japanese Utility Model Application Publication No. 06-025652 describes a lubrication system of a power transmission device in which an oil input groove and an inlet port of an oil drain groove are provided across from each other in a radial direction of an input gear, and in which the inlet port of the oil drain groove opens at a position that is at generally the same height as a part from which oil is introduced from the oil input groove to an oil retaining part of a rear cover.

Gear noise may be occasionally produced when the gears provided in the power transmission device are engaged with each other to be driven. Therefore, techniques for reducing gear noise have been known.

Japanese Patent Application Publication No. 2004-125054 describes a forged gear in which teeth which are obtained by changing at least one of the tooth thickness and the pressure angle of a reference tooth profile within the range of accuracy required for the teeth, are arranged along with the reference tooth profile. The gear obtained by this construction has teeth each having changed profiles and can reduce gear noise.

In addition to the above publication, there have been disclosed methods for reducing gear noise produced when gears are engaged with each other to be driven (see Japanese Patent Application Publication No. 2005-061487, Japanese Patent Application Publication No. 2006-144995, Japanese Patent Application Publication No. 2000-220726, Japanese Patent Application Publication No. 2002-235836, Japanese Patent Application Publication No. 2002-235837, and Japanese Patent Application Publication No. 2001-263453, for example).

In the power transmission device including three gears, the drive gear as a first gear is engaged with the idler gear as an intermediate gear, and the idler gear is engaged with the driven gear as a second gear. Although the methods described in the publications mentioned above reduce gear noise due to engagement between gears, there is still room left for improvement in the structure of the power transmission device, in which gear noise produced between the first gear and the intermediate gear and gear noise produced between the intermediate gear and the second gear occasionally amplify each other to increase the total gear noise.

SUMMARY OF THE INVENTION

The invention provides a power transmission device in which gear noise is reduced.

An aspect of the invention is directed to a power transmission device including: a first gear having a plurality of teeth that share an identical tooth profile; an intermediate gear that is engaged with the first gear; and a second gear that is engaged with the intermediate gear, and has a plurality of teeth that share an identical tooth profile, wherein the first gear and the second gear have an identical number of teeth, an identical reference diameter, and an identical reference pitch; and the tooth profile of the first gear is different from that of the second gear.

According to the invention, it is possible to provide a power transmission device in which gear noise may be more reduced.

BRIEF DESCRIPTION OF THE DRAWINGS

The foregoing and/or further objects, features and advantages of the invention will become more apparent from the following description of preferred embodiment with reference to the accompanying drawings, in which like numerals are used to represent like elements and wherein.

DETAILED DESCRIPTION OF EMBODIMENTS

A power transmission device in accordance with an embodiment of the invention will be described with reference to FIGS. 1 to 13. The power transmission device in accordance with this embodiment may be mounted in a four-wheel drive vehicle.

The power transmission device is also referred to as "multiple transmission device." The power transmission device is connected to the output side of a transmission. The rotational force (driving force) of an engine is input to the transmission, and the rotational force output from the transmission is input to the power transmission device.

The power transmission device distributes and outputs the rotational force output from the transmission to a front propeller shaft for front wheels and a rear propeller shaft for rear wheels. For example the power transmission device may transmit 60% of the input rotational force to the rear propeller shaft and 40% of the input rotational force to the front propeller shaft. The front propeller shaft is connected to the front wheels, and the rear propeller shaft is connected to the rear wheels.

Figure 1:
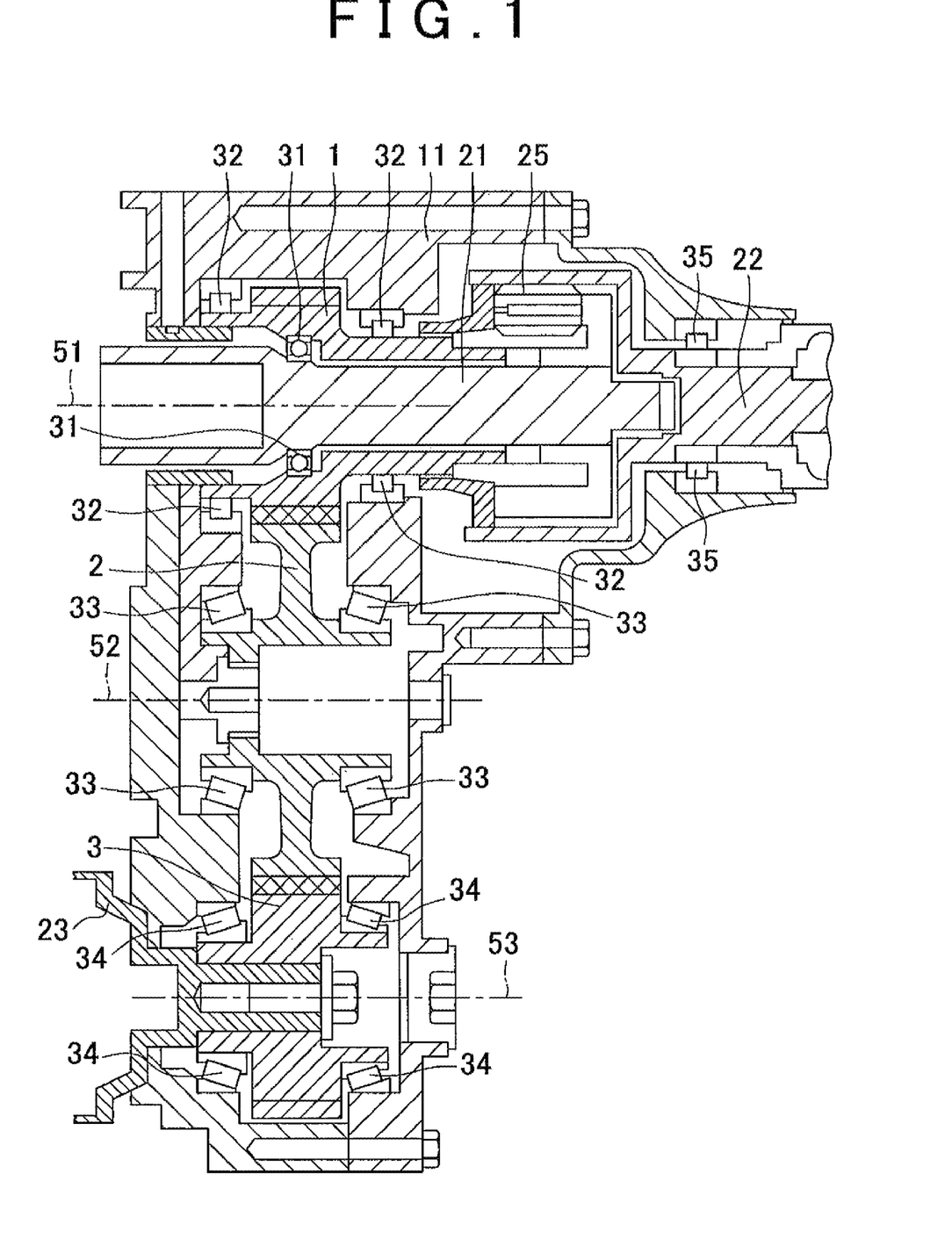
FIG. 1 is a schematic cross sectional view of a power transmission device in accordance with an embodiment of the invention.

FIG. 1 is a schematic cross sectional view of a power transmission device in accordance with this embodiment. The power transmission device in accordance with this embodiment includes three gears: a drive gear 1 as a first gear; an idler gear 2 as an intermediate gear for engagement with the drive gear 1; and a driven gear 3 as a second gear for engagement with the idler gear 2.

The power transmission device includes a housing 11. The drive gear 1, the idler gear 2, and the driven gear 3 are disposed in the housing 11.

The power transmission device includes an input shaft 21 for receiving rotational force from the transmission. The input shaft 21 is connected to an output shaft of the transmission.

The power transmission device includes a differential 25. The power transmission device includes an output shaft 22 connected to the differential 25. The output shaft 22 is coupled to the rear propeller shaft. The drive gear 1 is connected to the differential 25. The power transmission device is configured such that the rotational force of the differential 25 is transmitted to the drive gear 1.

The input shaft 21 is disposed to extend through the drive gear 1. The input shaft 21 is configured to rotate about the rotation axis 51. A bearing 31 is disposed between the drive gear 1 and the input shaft 21.

The drive gear 1 is supported on the housing 11 by a bearing 32. The drive gear 1 is configured to rotate about the rotation axis 51. The rotation axis 51 of the input shaft 21 is the same as the rotation axis 51 of the drive gear 1.

The output shaft 22 is supported on the housing 11 by a bearing 35. The output shaft 22 is configured to rotate about the rotation axis 51. The rotation axis 51 of the output shaft 22 is the same as the rotation axis 51 of the drive gear 1.

The idler gear 2 is configured to rotate about the rotation axis 52. The idler gear 2 is supported on the housing 11 by a bearing 33. The driven gear 3 is configured to rotate about the rotation axis 53. The rotation axes 51 to 53 are generally parallel to each other. The driven gear 3 is supported on the housing 11 by a bearing 34.

The power transmission device includes an output shaft 23. The output shaft 23 is configured to rotate together with the driven gear 3. The output shaft 23 is connected to the front propeller shaft. The front propeller shaft is connected to the front wheels.

In the power transmission device in accordance with this embodiment, the rotational force of the transmission is input to the input shaft 21. The rotational force of the input shaft 21 is transmitted to the differential 25. The rotational force of the differential 25 is transmitted to the output shaft 22 and the drive gear 1.

The rotational force transmitted to the output shaft 22 is transmitted via the rear propeller shaft to the rear wheels. The rotational force input to the drive gear 1 is transmitted to the idler gear 2. The rotational force input to the idler gear 2 is transmitted to the driven gear 3. The rotational force transmitted to the driven gear 3 is output from the output shaft 23. The rotational force output from the output shaft 23 is transmitted via the front propeller shaft to the front wheels.

The power transmission device in accordance with this embodiment is thus configured to distribute rotational force between the front wheels and the rear wheels.

Figure 2:
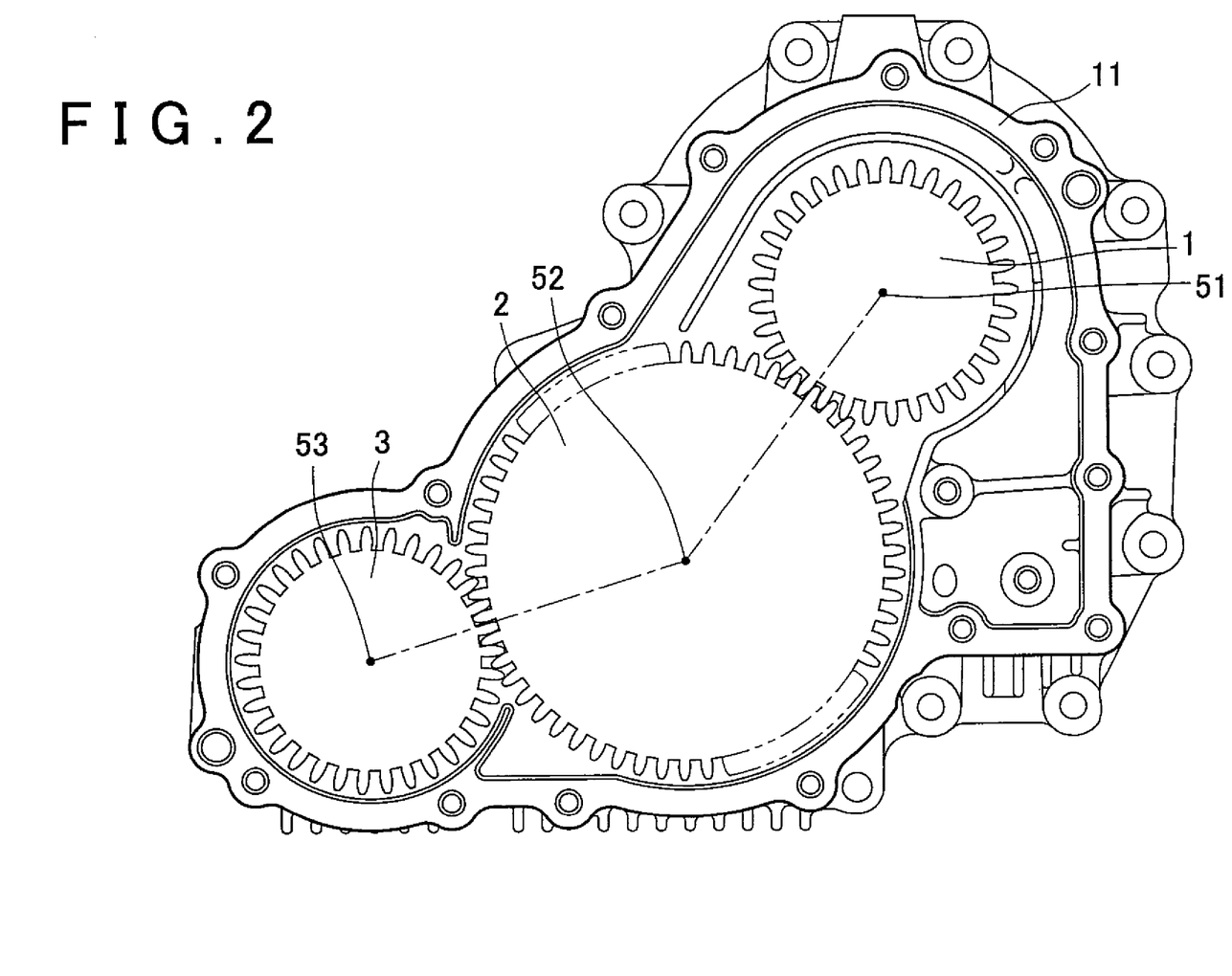
FIG. 2 is a schematic cross sectional view of a part of the power transmission device in accordance with the embodiment of the invention where a drive gear, an idler gear, and a driven gear are provided.

FIG. 2 is a schematic cross sectional view of the power transmission device in accordance with this embodiment. FIG. 2 shows a cross section taken along a plane in which the drive gear 1, the idler gear 2, and the driven gear 3 are disposed.

The drive gear 1, the idler gear 2, and the driven gear 3 in accordance with this embodiment are each a helical gear. A helical gear is a cylindrical gear having teeth with a helical trace. The power transmission device in accordance with this embodiment includes a gear train structure in which gears on three axes are concurrently engaged with each other.

In this embodiment, the first gear and the second gear have identical gear specifications. The drive gear 1 (first gear) and the driven gear 3 (second gear) have an identical number of teeth, an identical reference diameter, and an identical reference pitch to each other (the reference diameter and the reference pitch are defined in Japanese Industrial Standard (JISB0121: 1999 and JISB0102: 1999)).

The power transmission device in accordance with this embodiment is configured such that the phase of engagement between the drive gear 1 and the idler gear 2 is generally opposite to that of engagement between the idler gear 2 and the driven gear 3. Next, a case where the phases of engagement between these gears are the same as each other and a case where the phases of engagement between these gears are opposite to each other will be described.

Figure 3:
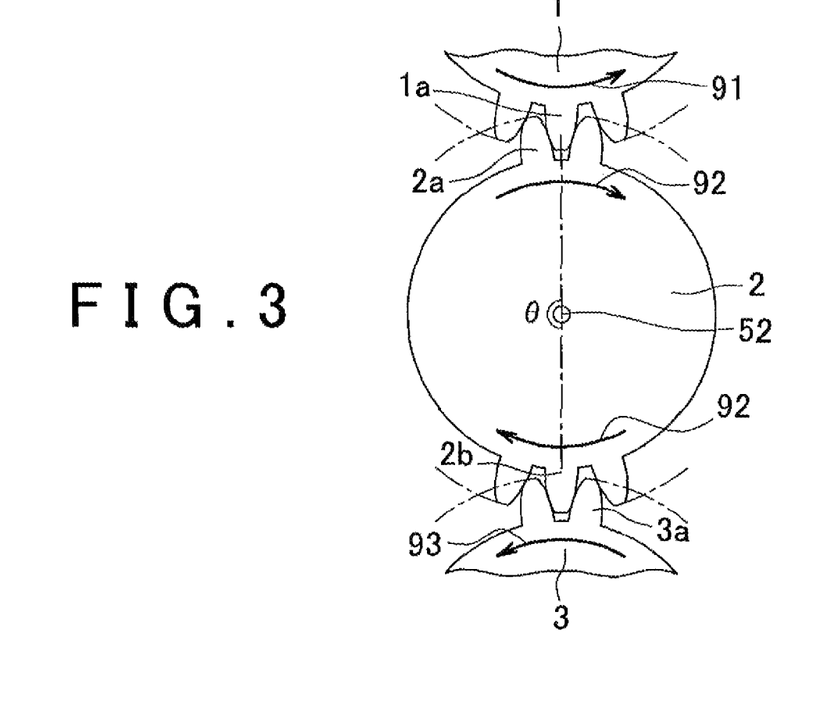
FIG. 3 is a schematic plan view of the drive gear, the idler gear, and the driven gear engaged with each other in the same phase.

FIG. 3 is a schematic plan view of the three gears engaged with each other in the same phase. The drive gear 1 has a plurality of teeth 1a arranged in the circumferential direction. The drive gear 2 has a plurality of teeth 2a, 2b arranged in the circumferential direction. The driven gear 3 has a plurality of teeth 3a arranged in the circumferential direction.

The drive gear 1 rotates in the direction indicated by the arrow 91. The teeth 1a of the drive gear 1 press the teeth 2a of the idler gear 2 to rotate the idler gear 2 in the direction indicated by the arrow 92. The teeth 2b of the idler gear 2 press the teeth 3a of the driven gear 3 to rotate the driven gear 3 in the direction indicated by the arrow 93.

When the drive gear 1, the idler gear 2, and the driven gear 3 are engaged with each other in the same phase, for example, a certain tooth 1a of the drive gear 1 contacts a certain tooth 2a of the idler gear 2 when a certain tooth 2b of the idler gear 2 contacts a certain tooth 3a of the driven gear 3. Also, a certain tooth 2b of the idler gear 2 separates from a certain tooth 3a of the driver gear 3 when a certain tooth 1a of the drive gear 1 separates from a certain tooth 2a of the idler gear 2. As described above, in the case where the gears are engaged with each other in the same phase, the cycle in which a tooth of the drive gear 1 contacts a tooth of the idler gear 2 is generally the same as that in which a tooth of the idler gear 2 contacts a tooth of the driven gear 3.

Figure 4:
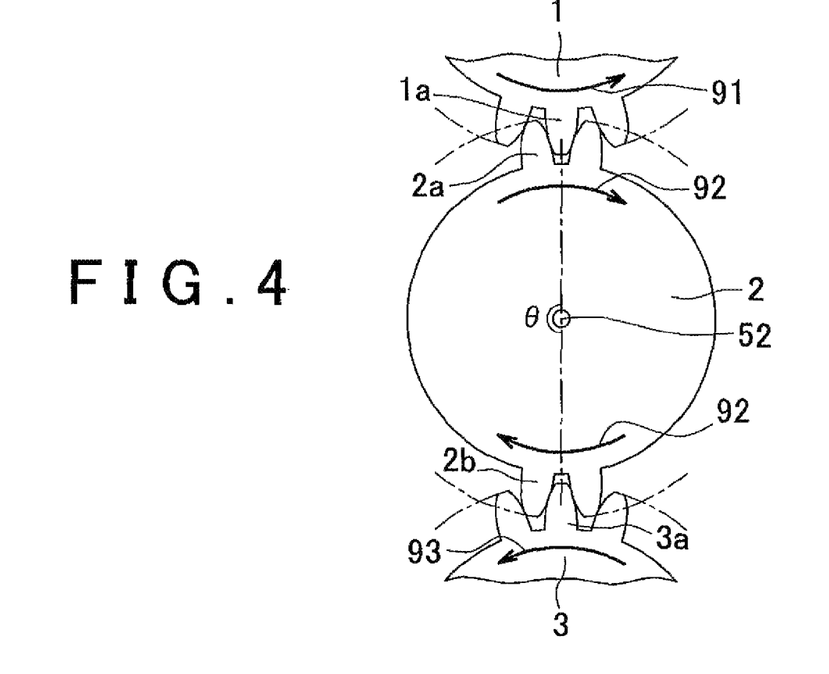
FIG. 4 is a schematic plan view of the drive gear, the idler gear, and the driven gear engaged with each other in the opposite phase.

FIG. 4 is a schematic plan view of the three gears engaged with each other in the opposite phase. When the gears are engaged with each other in the opposite phase, for example, a certain tooth 1a of the drive gear 1 contacts a certain tooth 2a of the idler gear 2 generally in the middle of a cycle in which a certain tooth 2b of the idler gear 2 contacts a certain tooth 3a of the driven gear 3. As described above, in the case where the gears are engaged with each other in the opposite phase, the contacting cycle between the drive gear 1 and the idler gear 2 is shifted from that between the idler gear 2 and the driven gear 3 by generally half a cycle.

Figure 5:
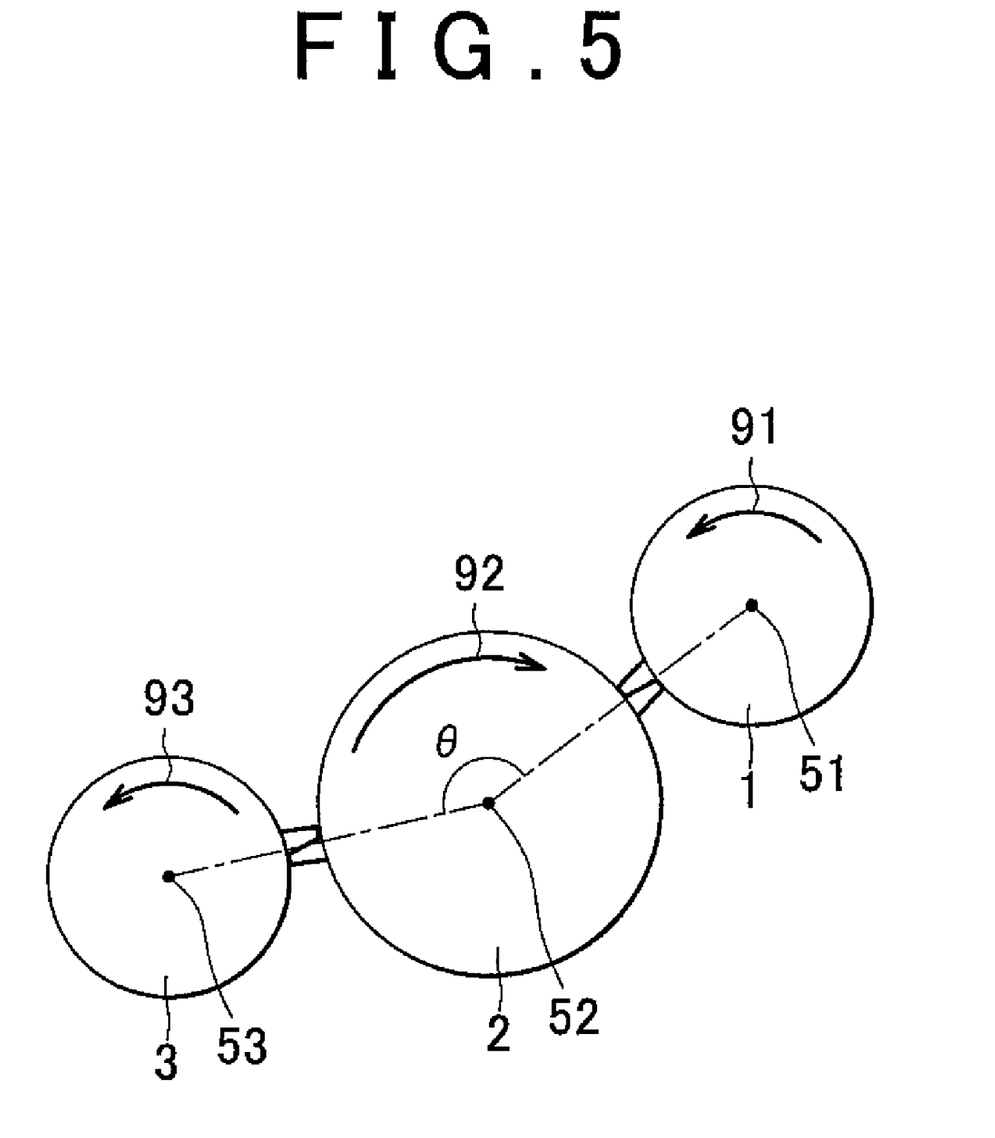
FIG. 5 is a schematic plan view illustrating the arrangement of the drive gear, the idler gear, and the driven gear in accordance with the invention.

FIG. 5 is a schematic plan view of the drive gear 1, the idler gear 2, and the driven gear 3 in accordance with this embodiment. An angle θ is formed between the line connecting the rotation axis 51 of the drive gear 1 and the rotation axis 52 of the idler gear 2 and the line connecting the rotation axis 52 of the idler gear 2 and the rotation axis 53 of the driven gear 3. The angle θ in this embodiment is set such that engagement between the drive gear 1 and the idler gear 2 is opposite to engagement between the idler gear 2 and the driven gear 3.

For example, the drive gear 1 and the driven gear 3 in accordance with this embodiment has X teeth. The idler gear 2 in accordance with this embodiment has Y teeth (numbers of pitches).

Next, a calculation is made to obtain the number of pitches (teeth) of the idler gear 2 disposed within the range of the angle θ.

$$\text{Number of pitches} = \theta/(\text{angle per tooth}) \quad (1)$$

The angle per tooth may be determined by (360°/Y). That is, the number of pitches of the idler gear 2 disposed within the range of the angle θ is represented by the following expression (2).

$$\text{Number of pitches} = \theta/(360/Y) \quad (2)$$

The gears are engaged with each other generally in the opposite phase if the thus obtained number of pitches is approximately equal to an integer. It is possible to have the gears engaged with each other in the opposite phase by choosing an appropriate angle θ that makes the number of pitches approximately equal to an integer.

In contrast, the gears are engaged with each other generally in the same phase if the number of pitches obtained by the expression (2) above is approximately (n (integer)+0.5). Thus, approximately (n+0.5) teeth are disposed in the range of the angle θ in the case where the gears are engaged with each other in the same phase as shown in FIG. 3, while approximately a number (an integer) of teeth are disposed in the range of the angle θ in the case where the gears are engaged with each other in the opposite phase as shown in FIG. 4.

Figure 6:
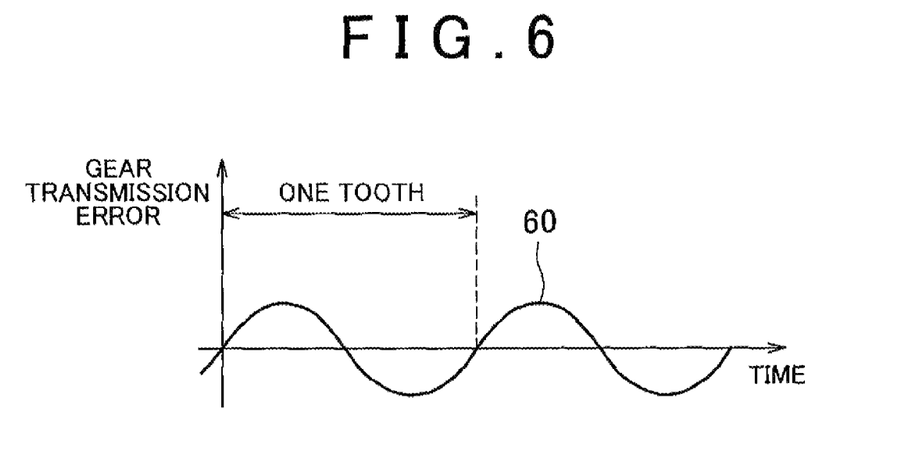
FIG. 6 is a graph illustrating the gear transmission error produced between two gears engaged with each other.

FIG. 6 is a graph illustrating the gear transmission error produced when a gear is engaged with another gear. The horizontal axis represents the time, and the vertical axis represents the gear transmission error. Rotational force is transmitted when a gear is engaged with another. The term "gear transmission error" as used herein refers to the amount of variation in the rotation angle for each tooth of a driven gear with respect to rotation of a drive gear. That is, the gear transmission error represents advancement and delay of the driven gear. The curve 60 represents an example of the gear transmission error. Engagement of one tooth corresponds to one cycle of the curve 60. Ideally, the amplitude of the gear transmission error is kept to a minimum.

Figure 7:
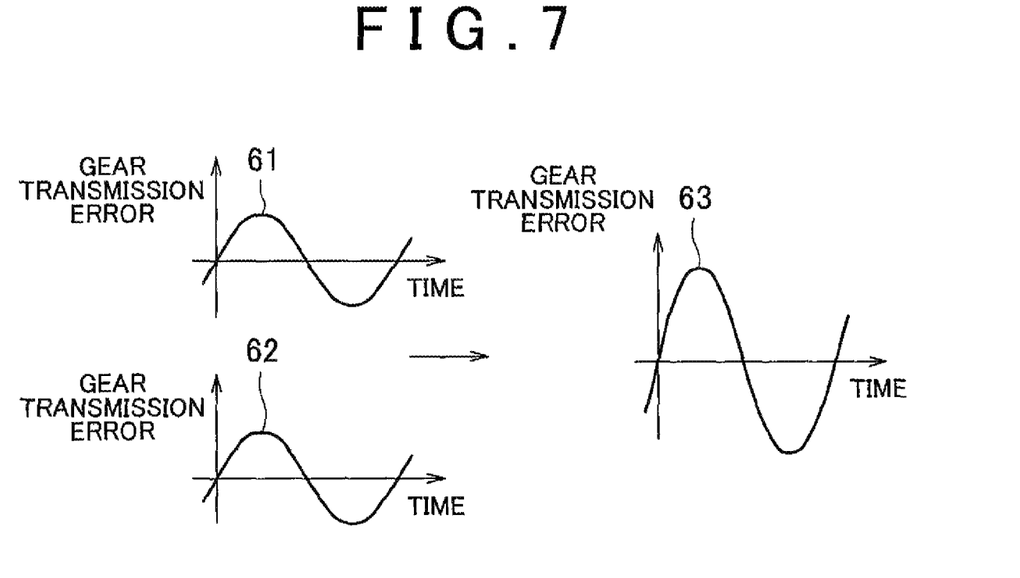
FIG. 7 illustrates the gear transmission error produced in a structure in which three gears are concurrently engaged with each other in the same phase.

FIG. 7 is a first graph showing the gear transmission error in accordance with this embodiment. FIG. 7 corresponds to the case shown in FIG. 3 where the phase of engagement between the drive gear 1 and the idler gear 2 is the same as that of engagement between the idler gear 2 and the driven gear 3.

The curve 61 represents the gear transmission error between the drive gear 1 and the idler gear 2. The curve 62 represents the gear transmission error between the idler gear 2 and the driven gear 3.

When the gears are engaged with each other in the same phase, these gear transmission errors are summed up to result in a large gear transmission error indicated by the curve 63. As a result, gear noise is increased. Thus, when the gears are engaged with each other in the same phase, the gear noise is amplified.

Figure 8:
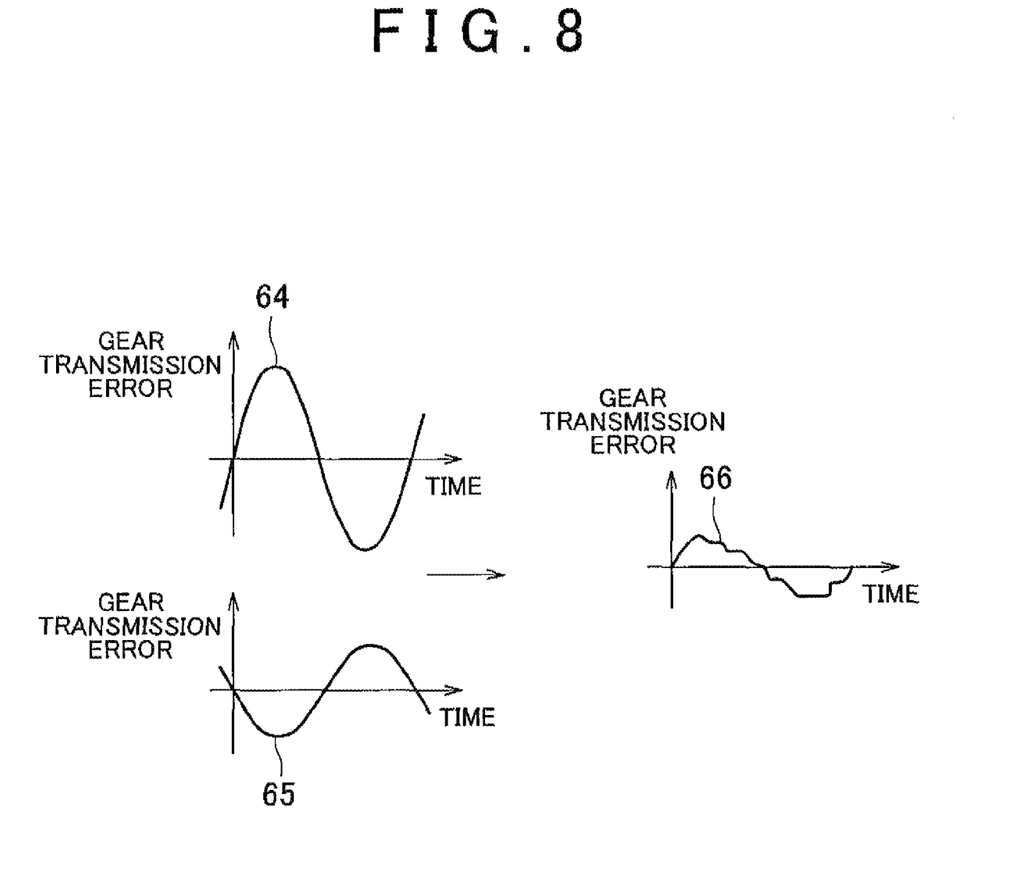
FIG. 8 illustrates the gear transmission error produced in a structure in which three gears are concurrently engaged with each other in the opposite phase.

FIG. 8 is a second graph showing the gear transmission error in accordance with this embodiment. FIG. 8 corresponds to the case shown in FIG. 4 where the phase of engagement between the drive gear 1 and the idler gear 2 is opposite to that of engagement between the idler gear 2 and the driven gear 3. The curve 64 represents the gear transmission error between the drive gear 1 and the idler gear 2. The curve 65 represents the gear transmission error between the idler gear 2 and the driven gear 3.

When the gears are engaged with each other in the opposite phase, the gear transmission errors cancel each other out to yield a small gear transmission error indicated by the curve 66. As a result, gear noise is reduced. It is thus possible to reduce gear noise produced in a gear train structure in which three gears are concurrently engaged with each other by engaging the gears with each other in the opposite phase.

In this embodiment, the phase of engagement between the drive gear 1 and the idler gear 2 is generally opposite to that of engagement between the idler gear 2 and the driven gear 3, and the amplitudes of the gear transmission error of the respective engagements are generally the same as each other. Therefore, the gear transmission errors of the respective engagements cancel each other out, which results in reduced gear noise.

With reference to FIGS. 1 and 2, in this embodiment, the drive gear 1 and the driven gear 3 having identical specifications are disposed with the single idler gear 2 interposed therebetween. Event in such a configuration the gear transmission errors of the respective engagements may be different from each other due to, for example, the difference between the support structure for the drive gear 1 and that for the driven gear 3.

As shown in FIG. 1, the shape of a part of the housing 11 that supports the drive gear 1 is different from that of a part of the housing 11 that supports the driven gear 3. In this case, slight deformation of the housing 11 itself, for example, may minutely misalign the respective axes of the gears. Such misalignment results in a gear transmission error between the gears. That is, there occurs a difference between the absolute values of the amplitudes of gear transmission error of the engagements. Therefore, there may remain a gear transmission error even if the respective gears are disposed such that the gear transmission errors therebetween are in the opposite phase to each other as shown in FIG. 8.

In this embodiment, in order to reduce the remaining gear transmission error, the drive gear 1 and the driven gear 3 are configured to have different tooth profiles. That is, at least one of the tooth profiles of the drive gear 1 and the driven gear 3 is modified so that their tooth profiles are different from each other.

The tooth profile of a plurality of teeth formed on each gear is identical. That is, the drive gear 1 has a plurality of teeth having an identical tooth profile, and the driven gear 3 has a plurality of teeth having an identical tooth profile.

The tooth profile parameter to be modified may be the pressure angle, the helix angle, the tooth profile roundness, and the crowning of each tooth (the tooth profile is defined in Japanese Industrial Standard (JISB0121: 1999, JISB1702-1: 1998, and JISB0102: 1999)).

In this embodiment, among these tooth profile parameters, the helix angle is modified. The gear transmission error may be further reduced by making the tooth profile of the drive gear 1 and that of the driven gear 3 different from each other. Modification of the respective tooth profile parameters is described below.

Figure 9:
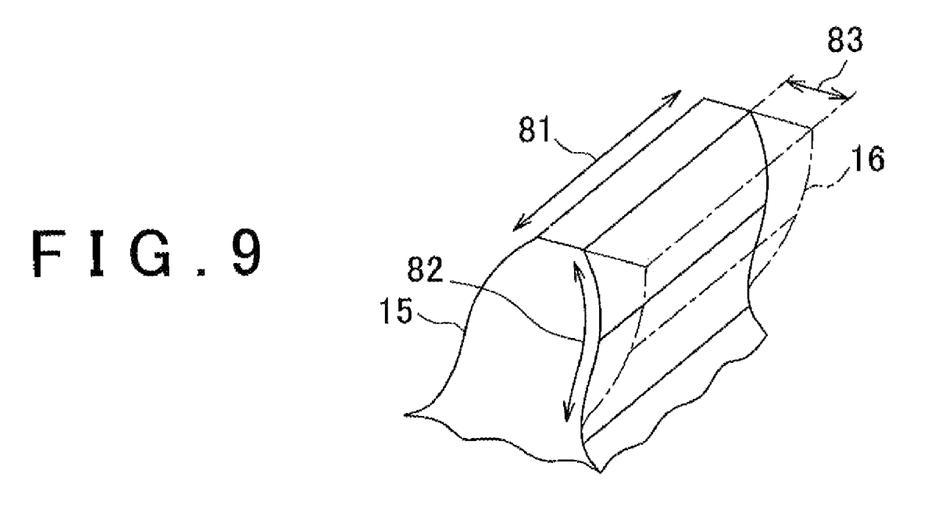
FIG. 9 is a schematic perspective view illustrating the modification amount of the pressure angle of a gear tooth.

FIG. 9 is a schematic perspective view of a gear tooth illustrating the modification amount of the pressure angle. A tooth 15 has a reference tooth profile. The reference tooth profile is the tooth profile of an involute gear (Japanese Industrial Standard (JISB1701-1: 1999)), for example. The arrow 81 indicates the tooth width direction. The arrow 82 indicates the tooth profile direction.

The pressure angle is defined as the angle between a diameter line of the pitch circle and a tangent to the tooth profile at the point where the diameter of the pitch circle and the tooth intersect each other. The pressure angle determines the direction of force produced when the tooth is engaged. Increasing the pressure angle thickens the root of the tooth to increase the strength of the tooth. The phantom line 16 indicates an extension of a tooth profile obtained by increasing the pressure angle. The modification amount of the pressure angle may be expressed not by the angle but by, for example, the length of the arrow 83 along the tooth top surface obtained by extending the phantom line 16 to the top surface.

Figure 10:
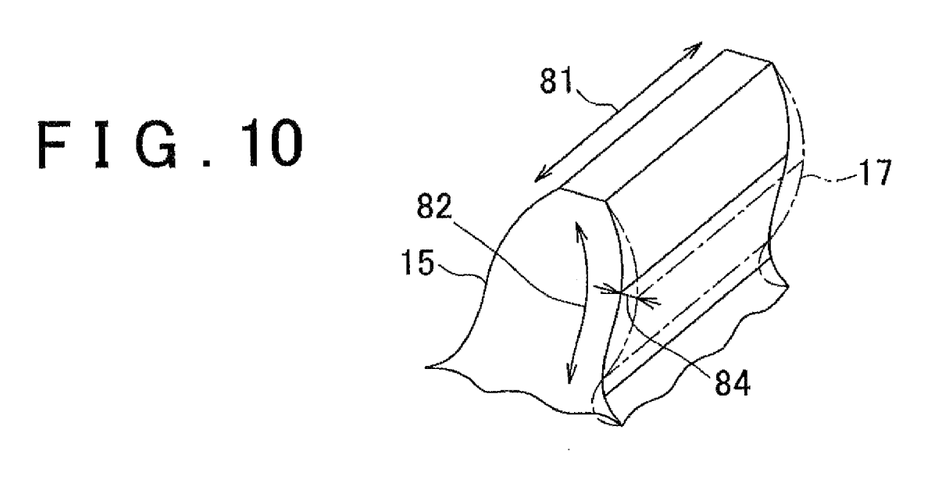
FIG. 10 is a schematic perspective view illustrating the modification amount of the tooth profile roundness of a gear tooth.

FIG. 10 is a schematic perspective view illustrating the modification amount of the tooth profile roundness. The tooth profile roundness is defined as swelling in the tooth profile direction indicated by the arrow 82. The phantom line 17 indicates a tooth profile obtained by modifying the tooth profile roundness. The modification amount of the tooth profile roundness may be expressed by the length of the arrow 84 corresponding to the amount of swelling at the inflection point of the tooth profile of the tooth 15.

Figure 11:
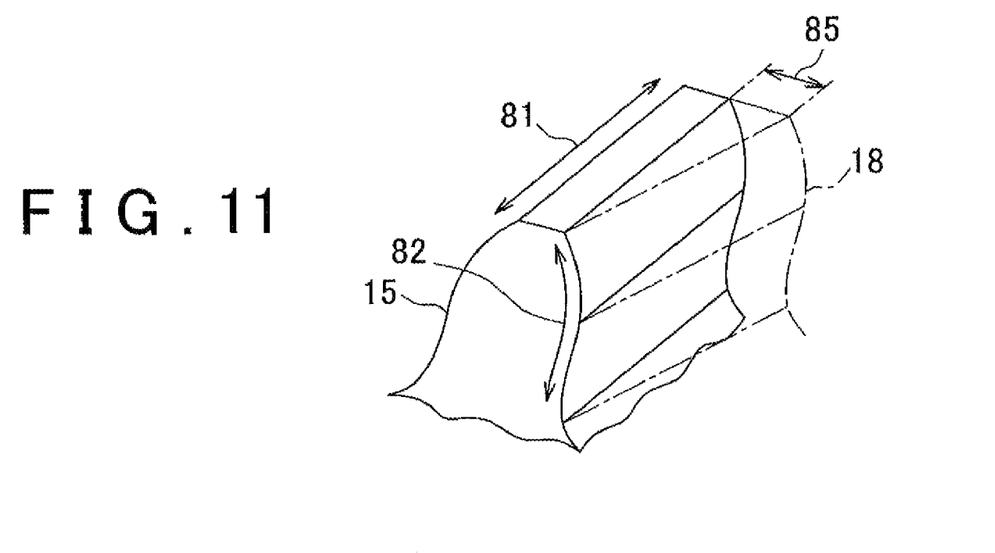
FIG. 11 is a schematic perspective view illustrating the modification amount of the helix angle of a gear tooth.

FIG. 11 is a schematic perspective view illustrating the modification amount of the helix angle. The helix angle is defined as the angle of the tooth trace relative to the rotation axis of the gear. The phantom line 18 indicates a tooth profile obtained by modifying the helix angle. The modification amount of the helix angle may be expressed not only by the inclination angle of the tooth trace relative to the rotation axis but also the length of the arrow 85 at a corner of the tooth top surface obtained by rotating the tooth width indicated by the arrow 81 about an opposite corner as a pivot.

Figure 12:
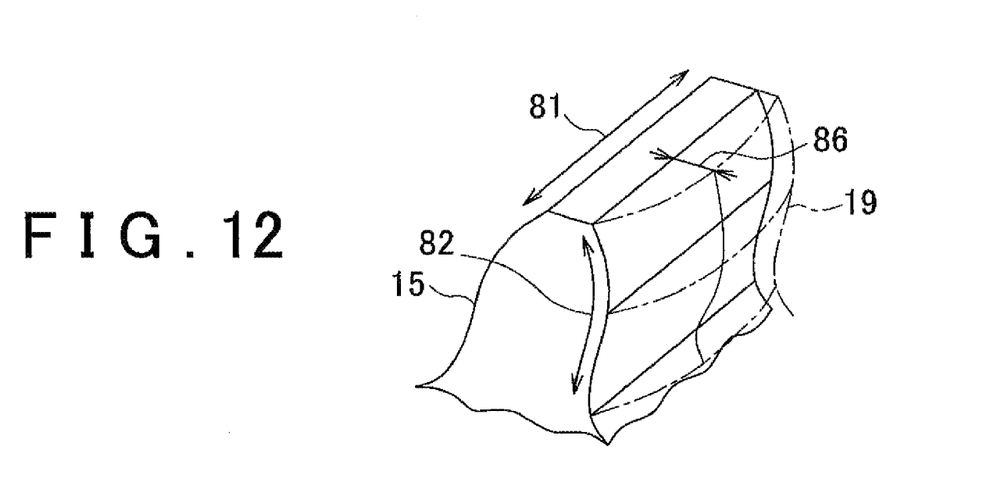
FIG. 12 is a schematic perspective view illustrating the modification amount of the crowning of a gear tooth.

FIG. 12 is a schematic perspective view illustrating the modification amount of the crowning. The phantom line 19 indicates a tooth profile obtained by modifying the crowning. To modify the crowning, swelling is formed in the tooth width direction indicated by the arrow 81. The modification amount of the crowning may be expressed by the length of the arrow 86 indicating the amount of swelling generally at the center in the tooth width direction.

Table 1 shows the modification amounts of the respective tooth profile parameters of the drive gear 1 and the driven gear 3 in accordance with this embodiment. Table 1 shows relative values of the modification amounts of the drive gear 1 and the driven gear 3 shown in FIGS. 9 to 12. In this embodiment, the modification amounts correspond to modifications from the profile of an involute gear as the reference profile. Table 1 shows the modification amounts of the respective tooth profile parameters for a tooth surface to be in pressure contact during acceleration and that to be in contact during deceleration of the drive gear 1 and the driven gear 3.

TABLE 1

| | DRIVE GEAR | | DRIVEN GEAR | |
|---|---|---|---|---|
| | TOOTH SURFACE FOR ACCELERATION | TOOTH SURFACE FOR DECELERATION | TOOTH SURFACE FOR ACCELERATION | TOOTH SURFACE FOR DECELERATION |
| PRESSURE ANGLE MODIFICATION AMOUNT | a | a | a | a |
| HELIX ANGLE MODIFICATION AMOUNT | b | b | b | b |
| TOOTH PROFILE ROUNDNESS MODIFICATION AMOUNT | c | c | c | c |
| CROWNING MODIFICATION AMOUNT | d | d | d | d |

In this embodiment the modification amounts of the pressure angle, the tooth profile roundness, and the crowning are the same for both the drive gear 1 and the driven gear 3. In this embodiment, the modification amount of the helix angle is different between the drive gear 1 and the driven gear 3. By adjusting the modification amount of the helix angle in this manner, gear noise may be further reduced.

Figure 13:
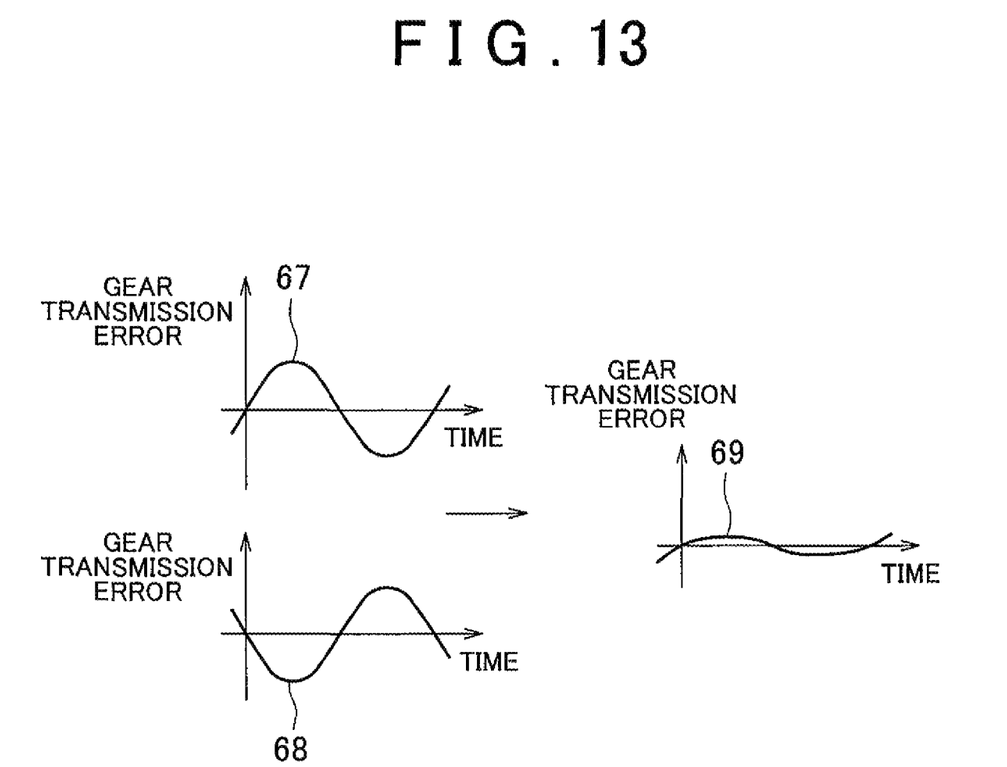
FIG. 13 illustrates the gear transmission error produced in a structure in which three gears are concurrently engaged with each other in accordance with the invention when the tooth profiles of two gears are respectively modified.

FIG. 13 is a third graph showing the gear transmission error in accordance with this embodiment. FIG. 13 depicts to the situation where the modification amount of a tooth profile parameter is different between the drive gear 1 and the driven gear 3. The curve 67 represents the gear transmission error between the drive gear 1 and the idler gear 2. The curve 68 represents the gear transmission error between the idler gear 2 and the driven gear 3. In this embodiment, the absolute values of the amplitudes of the curve 67 and the curve 68 are generally the same as each other as a result of the modification of the tooth profile.

Thus, the gear transmission errors substantially completely cancel out each other to result in a total gear transmission error of substantially zero as indicated by the curve 69. As a result, gear noise may be further reduced.

As described above, in this embodiment, the tooth profile of the drive gear 1 and the tooth profile of the driven gear 3 are configured such that the amplitude of the gear transmission error between the drive gear 1 and the idler gear 2 is generally the same as the amplitude of the gear transmission error between the idler gear 2 and the driven gear 3. According to this construction, gear noise is effectively reduced.

Also, in this embodiment, the tooth profile of the drive gear 1 and the tooth profile of the driven gear 3 are configured such that the gear transmission error between the drive gear 1 and the idler gear 2 cancels out the gear transmission error between the idler gear 2 and the driven gear 3. According to this construction, gear noise is effectively reduced.

Figure 14:
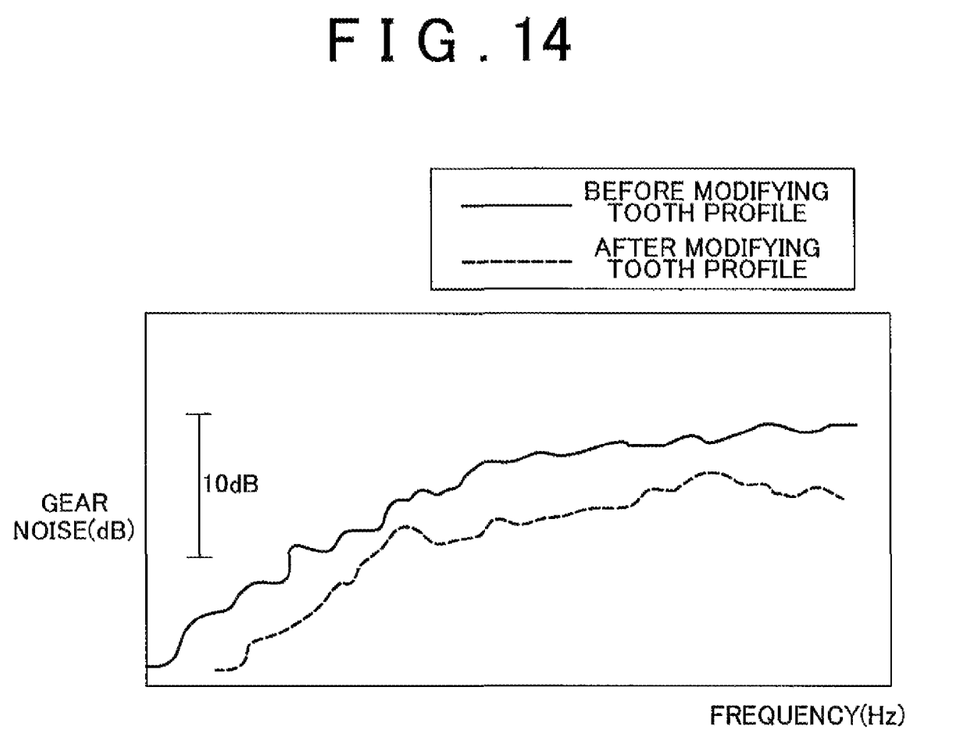
FIG. 14 is a graph illustrating the effect to reduce gear noise achieved by the power transmission device in accordance with the embodiment of the invention.

FIG. 14 shows the results of a test in which the tooth profile is the same between the drive gear 1 and the driven gear 3 and a test in which the tooth profile is different between the drive gear 1 and the driven gear 3. Gear noise was reduced by 3 to 5 dB by making the helix angle of the drive gear 1 and that of the driven gear 3 different from each other. As described above, modifying the tooth profiles of the drive gear 1 and the driven gear 3 individually effectively reduces gear noise.

Although the modification amount of the helix angle is adjusted to reduce gear noise in this embodiment, the invention is not limited thereto, and any tooth profile parameter may be modified. For example, the tooth profile parameter to be modified may include at least one of the pressure angle, the helix angle, the tooth profile roundness, and the crowning. The difference in the modification amount of the respective tooth profile parameters shown in FIGS. 9 to 12, for example, may be 2 μm or more and 15 μm or less.

To modify the tooth profile, any tooth profile parameter may be modified according to the type of gear noise produced by respective gears. For example, gears may produce different types of gear noise due to the respective support structures for the gears as described above, and the tooth profile parameters of the gears may be modified according to the types of gear noise produced.

Although a helical gear is taken as an example for description in this embodiment, the invention is not limited thereto, and may be applied to a spur gear which is a cylindrical gear having teeth with a trace parallel to the rotation axis.

Although a power transmission device to be mounted in an automobile is taken as an example for description in this embodiment, the invention is not limited thereto, and may be applied to any power transmission device including a first gear, an intermediate gear for engagement with the first gear, and a second gear for engagement with the intermediate gear.

In the drawings described above, identical or corresponding parts are given identical reference numerals and symbols.

It should be understood that the above embodiment is only illustrative and not to be construed as limitative. The scope of the invention is defined not by the above description but by the appended claims, and includes all equivalents covered by the claims and all modifications that fall within the scope of the claims.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

What is claimed is:

1. A power transmission device comprising:
    a first gear having a plurality of teeth that share an identical tooth profile;
    an intermediate gear that is engaged with the first gear; and
    a second gear that is engaged with the intermediate gear, and has a plurality of teeth that share an identical tooth profile, wherein
    the first gear and the second gear have an identical number of teeth, an identical reference diameter, and an identical reference pitch; and
    the tooth profile of the first gear is different from that of the second gear; wherein
    the tooth profile of the first gear and that of the second gear are configured such that a gear transmission error between the first gear and the intermediate gear cancels out a gear transmission error between the intermediate gear and the second gear.

2. The power transmission device according to claim 1, wherein
    the tooth profile of the first gear is different from that of the second gear in at least one of a pressure angle, a helix angle, a tooth profile roundness, and a crowning.

3. The power transmission device according to claim 1, wherein
    a phase of engagement between the first gear and the intermediate gear is generally opposite to that of engagement between the intermediate gear and the second gear.

4. The power transmission device according to claim 3, wherein
    the phase of engagement between the first gear and the intermediate gear is made generally opposite to that of engagement between the intermediate gear and the second gear by shifting a contacting cycle between the first gear and the intermediate gear from that between the intermediate gear and the second gear by generally half a cycle.

5. The power transmission device according to claim 1, wherein
    at least one of the first gear, the intermediate gear, and the second gear is a helical gear.

6. A power transmission device comprising:
    a first gear having a plurality of teeth that share an identical tooth profile;
    an intermediate gear that is engaged with the first gear; and
    a second gear that is engaged with the intermediate gear, and has a plurality of teeth that share an identical tooth profile, wherein
    the first gear and the second gear have an identical number of teeth, an identical reference diameter, and an identical reference pitch; and
    the tooth profile of the first gear is different from that of the second gear; wherein
    the tooth profile of the first gear and that of the second gear are configured such that an amplitude of the gear transmission error between the first gear and the intermediate gear is generally the same as that of the gear transmission error between the intermediate gear and the second gear.

* * * * *